United States Patent
Li et al.

(10) Patent No.: US 11,227,380 B2
(45) Date of Patent: Jan. 18, 2022

(54) AUTOMATIC INTERPRETATION METHOD FOR WINTER WHEAT BASED ON DEFORMABLE FULLY CONVOLUTIONAL NEURAL NETWORK

(71) Applicant: North China Institute of Aerospace Engineering, Hebei (CN)

(72) Inventors: Long Li, Hebei (CN); Xuqing Li, Hebei (CN); Qinxue Zhang, Hebei (CN); Yongtao Jin, Hebei (CN); Guohong Li, Hebei (CN); Di Liu, Hebei (CN); Yuanping Liu, Hebei (CN)

(73) Assignee: NORTH CHINA INSTITUTE OF AEROSPACE ENGINEERING

( * ) Notice: Subject to any disclaimer, the term of this patent is extended or adjusted under 35 U.S.C. 154(b) by 0 days.

(21) Appl. No.: 17/038,129

(22) Filed: Sep. 30, 2020

(65) Prior Publication Data

US 2021/0272266 A1   Sep. 2, 2021

(30) Foreign Application Priority Data

Feb. 27, 2020   (CN) .......................... 202010124111.9

(51) Int. Cl.
  *G06T 7/00*    (2017.01)
  *G06N 3/04*    (2006.01)

(52) U.S. Cl.
  CPC ......... *G06T 7/0004* (2013.01); *G06N 3/0454* (2013.01); *G06T 2207/20084* (2013.01); *G06T 2207/30188* (2013.01)

(58) Field of Classification Search
  CPC ........ B65G 15/52; B65G 17/08; B65G 17/40; G06N 3/0454; G06T 2207/10032; G06T 2207/20081; G06T 2207/20084; G06T 2207/30188; G06T 7/0004; G06T 7/0012
  See application file for complete search history.

(56) References Cited

U.S. PATENT DOCUMENTS

| | | | |
|---|---|---|---|
| 2020/0042871 A1* | 2/2020 | Francini | G06K 9/6256 |
| 2020/0380665 A1* | 12/2020 | Horii | G06N 3/04 |
| 2021/0272266 A1* | 9/2021 | Li | G06T 7/0012 |
| 2021/0279881 A1* | 9/2021 | Bagci | G06K 9/6268 |
| 2021/0312591 A1* | 10/2021 | Ren | G06N 3/0454 |

* cited by examiner

Primary Examiner — Bobbak Safaipour
(74) Attorney, Agent, or Firm — Edmonds & Cmaidalka, P.C.

(57) ABSTRACT

The present invention discloses an automatic interpretation method for winter wheat based on a deformable fully convolutional neural network (FCN). The method includes the following steps: step 1: using a region corresponding to a winter wheat planting area as a research region, and obtaining a high-resolution remote sensing image of the research region; step 2: preprocessing the obtained remote sensing image: extracting geometric changes of sizes, fields of view, postures, and partial deformation of winter wheat objects in different spatial positions in the high-resolution image as sample data; step 3: establishing the deformable FCN; step 4: inputting the sample data to the deformable FCN to implement training of the deformable FCN; and step 5: inputting a to-be-recognized remote sensing image of winter wheat to the trained deformable FCN, and outputting a prediction graph of a winter wheat planting area in a to-be-recognized region.

6 Claims, 1 Drawing Sheet

AUTOMATIC INTERPRETATION METHOD FOR WINTER WHEAT BASED ON DEFORMABLE FULLY CONVOLUTIONAL NEURAL NETWORK

CROSS-REFERENCE TO RELATED APPLICATIONS

This application claims priority to Chinese Patent Application having serial number 202010124111.9, filed on Feb. 27, 2020. The entirety of which is incorporated by reference herein.

BACKGROUND OF THE INVENTION

Field of the Invention

The present invention relates to the field of remote sensing technologies, and in particular, to an automatic interpretation method for winter wheat based on a deformable fully convolutional neural network (FCN).

Description of the Related Art

A conventional remote sensing ground object classification mode mainly relies on the calculation of a complex manual feature (such as a vegetation index threshold) from an original data input and the application of the obtained feature in hyperspectral data classification. These methods are usually based on low-level features such as a spectral feature, a texture feature, and a geometric feature, without considering a complex spatial feature, require rich experience as a guide, and show specific subjectivity, limiting the accuracy and a generalization capability of a model. Therefore, how to effectively extract a spectral and spatial information feature and an advanced semantic feature of a high-resolution image is the key to a task for remote sensing image recognition.

With the continuous development of deep learning, as a complex feature extractor, a pixel-based convolutional neural network has been widely used in ground object extraction of a remote sensing image. Jonathan et al. have proposed an FCN. A convolutional layer is used to replace a fully connected layer of a conventional neural network for deconvolution, so as to resolve a problem of a spatial coordinate loss. Moreover, a low-level feature of a shallow network is coupled with a high-level feature of a deep network, and more accurate and detailed image segmentation can be conducted on an image object through training. Olaf et al. have expanded a network framework based on an FCN and proposed U-Net. The segmentation accuracy of U-Net is improved through its deeper feature coupling. The above network has a good effect for expressing rich features of a high-dimensional image, but there are the following problems: 1. Winter wheat objects in different spatial positions in a high-resolution image have geometric changes in sizes, fields of view, postures, and partial deformation, and a convolution module of a fixed structure limits a capability of generalizing a feature of a deformable object. 2. A pixel-level classification method is sensitive to noise, is difficult to obtain object-level semantic information, and will produce "salt-and-pepper" noise in a predicted image while improving the accuracy of the overall image recognition. Therefore, it is necessary to adaptively determine a scale or a reception field for a ground object recognition task of a remote sensing image with fine positioning.

SUMMARY OF THE INVENTION

The present invention provides an automatic interpretation method for winter wheat based on a deformable FCN. An improved U-Net model is introduced into the field of winter wheat area extraction; a high-resolution No. 2 remote sensing image is used as a research object; the multi-feature extraction of winter wheat is conducted by using the model, and an idea of deformable convolution is introduced; and a trainable two-dimensional offset is added before each convolutional layer in the network to implement deformable convolution and obtain object-level semantic information. In this way, the method can eliminate the interference resulting from a characteristic "the same spectrum with different objects" of the remote sensing image while enhancing the expression of features of winter wheat with different sizes and spatial distributions by using the model.

To achieve the above purpose, the present invention provides the following technical solutions.

An automatic interpretation method for winter wheat based on a deformable fully convolutional neural network (FCN) includes the following steps:

step 1: using a region corresponding to a winter wheat planting area as a research region, and obtaining a high-resolution remote sensing image of the research region;

step 2: preprocessing the obtained remote sensing image: extracting geometric changes of sizes, fields of view, postures, and partial deformation of winter wheat objects in different spatial positions in the high-resolution image as sample data;

step 3: establishing the deformable FCN, where the deformable FCN includes a network input layer, a network output layer, a first convolutional layer module, a second convolutional layer module, a third convolutional layer module, a fourth convolutional layer module, a fifth convolutional layer module, a sixth convolutional layer module, a seventh convolutional layer module, and an eighth convolutional layer module; a first pooling layer and a first deformable convolution module are successively arranged between the first convolutional layer module and the second convolutional layer module; a second pooling layer and a second deformable convolution module are successively arranged between the second convolutional layer module and the third convolutional layer module; a third pooling layer and a third deformable convolution module are successively arranged between the third convolutional layer module and the fourth convolutional layer module; a fourth pooling layer and a fourth deformable convolution module are successively arranged between the fourth convolutional layer module and the fifth convolutional layer module; a first deconvolutional layer and a fifth deformable convolution module are successively arranged between the fifth convolutional layer module and the sixth convolutional layer module; a second deconvolutional layer and a sixth deformable convolution module are successively arranged between the sixth convolutional layer module and the seventh convolutional layer module; a third deconvolutional layer and a seventh deformable convolution module are successively arranged between the seventh convolutional layer module and the eighth convolutional layer module; and a fourth deconvolutional layer is arranged between the eighth convolutional layer module and the network output layer;

the network input layer is used to convert both constructed image data and marked data in the winter wheat area in the image data into corresponding three-dimensional tensors through python;

the network output layer is used to predict to-be-predicted image data by using a trained model, to obtain a final prediction graph based on each pixel;

the convolutional layer module is used to conduct feature extraction on an input image, and generate a feature mapping graph;

the pooling layer is used to conduct downsampling on a feature graph output by a previous convolutional layer, and compress the feature mapping graph through downsampling, so as to reduce the network computing complexity;

the deconvolutional layer is used to enable a low-dimensional feature graph upsampled to a high-dimensional prediction graph to implement end-to-end training;

the deformable convolution module is used to implement deformable convolution by training an offset including position information of a sampling point, to obtain a geometric deformation feature of winter wheat;

step 4: inputting the sample data to the deformable FCN to implement training of the deformable FCN; and step 5: inputting a to-be-recognized remote sensing image of winter wheat to the trained deformable FCN, and outputting a prediction graph of a winter wheat planting area in a to-be-recognized region.

Optionally, the deformable convolution module adds a trainable two-dimensional offset to a sampling position of a conventional grid in a standard convolution module, so that a sampling grid can be freely deformed.

Optionally, the adding, by the deformable convolution module, a trainable two-dimensional offset to a sampling position of a conventional grid in a standard convolution module, so that a sampling grid can be freely deformed specifically includes:

(1) conducting sampling on feature mapping x by using a regular convolution grid;

(2) obtaining a sum of sampling values of a weight w, where the grid is used to define a size and a position of a current reception field;

grid={(−1,0), . . . ,(0,1),(1,1)}

(3) obtaining a sum of a weight w of each position in the convolution grid and an input x in a position pn, to obtain an output y in each position p0 in a feature graph output by each convolutional layer:

$$y(p_0) = \sum_{p_n \in grid} w(p_n) \cdot x(pn) + b$$

where in this formula, pn is a sampling point position in the feature graph before deformation occurs, and p0 is a sampling point position in the feature graph after deformation occurs;

(4) obtaining a trainable offset $\Delta p_n$, where the trainable offset satisfies the following constraint condition:

{$\Delta p_n$|n=1, . . . ,N},N=|grid|

(5) introducing the trainable offset $\Delta p_n$ into a conventional convolution model to obtain a deformable convolution formula:

$$y(p_0) = \sum_{p_n \in grid} w(p_n) \cdot x(pn + \Delta p_n) + b$$

Optionally, the first convolutional layer module includes a convolutional layer C1 and a convolutional layer C2; the second convolutional layer module includes a convolutional layer C3 and a convolutional layer C4; the third convolutional layer module includes a convolutional layer C5 and a convolutional layer C6; the fourth convolutional layer module includes a convolutional layer C7 and a convolutional layer C8; the fifth convolutional layer module includes a convolutional layer C9 and a convolutional layer C10; the sixth convolutional layer module includes a convolutional layer C11 and a convolutional layer C12; the seventh convolutional layer module includes a convolutional layer C13 and a convolutional layer C14; and the eighth convolutional layer module includes a convolutional layer C15 and a convolutional layer C16.

Optionally, a size of a convolution kernel of each of the convolutional layers C1-16 is a 3×3 matrix, and a missing part in the feature graph in a convolution process is padded in a padding mode.

Optionally, a size of a convolution kernel of each of the first convolutional layer, the second convolutional layer, the third convolutional layer, and the fourth convolutional layer is a 2×2 matrix; and after deconvolution, a concatenate function is used for feature aggregation to aggregate a feature graph of a deconvolutional layer in a downsampling process and a feature graph of a convolutional layer during corresponding upsampling.

Compared with the prior art, the technology has the following beneficial effects:

According to the automatic interpretation method for winter wheat based on a deformable FCN provided in the present invention, for a ground object of winter wheat in a high-resolution remote sensing image, a trainable offset is introduced into the improved U-Net network model to implement deformable convolution and obtain a deformable convolution capability. A deformable FCN model can enhance the expression of a geometric change feature of winter wheat in a high-resolution remote sensing image while fully expressing a spectral and time feature of the winter wheat, so as to enhance the robustness and a generalization capability of the model and significantly reduce "salt-and-pepper noise".

BRIEF DESCRIPTION OF THE DRAWINGS

To describe the technical solutions in the examples of the present invention or in the prior art more clearly, the following briefly describes the accompanying drawings required for the examples. Apparently, the accompanying drawings in the following description show merely some examples of the present invention, and a person of ordinary skill in the art may still derive other accompanying drawings from these accompanying drawings without creative efforts.

DETAILED DESCRIPTION

The following clearly and completely describes the technical solutions in the examples of the present invention with reference to accompanying drawings in the examples of the present invention. Apparently, the described examples are merely a part rather than all of the examples of the present invention. All other examples obtained by a person of ordinary skill in the art based on the examples of the present invention without creative efforts shall fall within the protection scope of the present invention.

The present invention provides an automatic interpretation method for winter wheat based on a deformable FCN. An improved U-Net model is introduced into the field of winter wheat area extraction; a high-resolution No. 2 remote sensing image is used as a research object; the multi-feature extraction of winter wheat is conducted by using the model, and an idea of deformable convolution is introduced; and a trainable two-dimensional offset is added before each convolutional layer in the network to implement deformable convolution and obtain object-level semantic information. In this way, the method can eliminate the interference resulting from a characteristic "the same spectrum with different objects" of the remote sensing image while enhancing the expression of features of winter wheat with different sizes and spatial distributions by using the model.

To make the above objectives, features, and advantages of the present invention more obvious and understandable, the present invention is further described in detail below with reference to the accompanying drawings and detailed examples.

Figure 1:
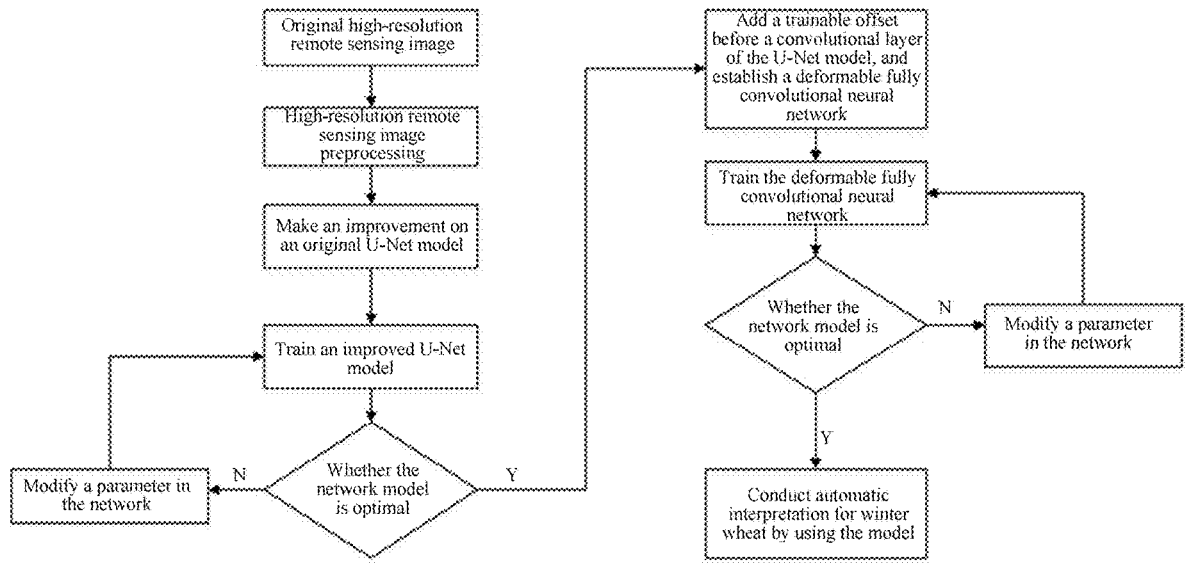
FIG. 1 is a flowchart of an automatic interpretation method for winter wheat based on a deformable FCN according to one embodiment of the present invention.

FIG. 1 is a flowchart of an automatic interpretation method for winter wheat based on a deformable FCN according to an example of the present invention. As shown in FIG. 1, the automatic interpretation method for winter wheat based on a deformable FCN includes the following steps:

Step 1: Use a region corresponding to a winter wheat planting area as a research region, and obtain a high-resolution remote sensing image of the research region.

Step 2: Preprocess the obtained remote sensing image: extract geometric changes of sizes, fields of view, postures, and partial deformation of winter wheat objects in different spatial positions in the high-resolution image as sample data.

Step 3: Establish the deformable FCN, where the deformable FCN includes a network input layer, a network output layer, a first convolutional layer module, a second convolutional layer module, a third convolutional layer module, a fourth convolutional layer module, a fifth convolutional layer module, a sixth convolutional layer module, a seventh convolutional layer module, and an eighth convolutional layer module; a first pooling layer and a first deformable convolution module are successively arranged between the first convolutional layer module and the second convolutional layer module; a second pooling layer and a second deformable convolution module are successively arranged between the second convolutional layer module and the third convolutional layer module; a third pooling layer and a third deformable convolution module are successively arranged between the third convolutional layer module and the fourth convolutional layer module; a fourth pooling layer and a fourth deformable convolution module are successively arranged between the fourth convolutional layer module and the fifth convolutional layer module; a first deconvolutional layer and a fifth deformable convolution module are successively arranged between the fifth convolutional layer module and the sixth convolutional layer module; a second deconvolutional layer and a sixth deformable convolution module are successively arranged between the sixth convolutional layer module and the seventh convolutional layer module; a third deconvolutional layer and a seventh deformable convolution module are successively arranged between the seventh convolutional layer module and the eighth convolutional layer module; and a fourth deconvolutional layer is arranged between the eighth convolutional layer module and the network output layer.

The network input layer is used to input an image, where the input layer converts both constructed image data (multiple cut tif images of a same size) and marked data (marked data in the winter wheat area in the image data) into corresponding three-dimensional tensors (three-dimensional matrices) through python.

The network output layer is used to output a prediction graph, and predict to-be-predicted image data by using a trained model, to obtain a final prediction graph based on each pixel.

The convolutional layer module is used to conduct feature extraction on an input image, and generate a feature mapping graph.

The pooling layer is used to conduct downsampling on a feature graph output by a previous convolutional layer, and compress the feature mapping graph through downsampling, so as to reduce the network computing complexity.

The deconvolutional layer is used to enable a low-dimensional feature graph upsampled to a high-dimensional prediction graph to implement end-to-end training.

The deformable convolution module is used to implement deformable convolution by training an offset including position information of a sampling point, to obtain a geometric deformation feature of winter wheat.

Step 4: Input the sample data to the deformable FCN to implement training of the deformable FCN.

Step 5: Input a to-be-recognized remote sensing image of winter wheat to the trained deformable FCN, and output a prediction graph of a winter wheat planting area in a to-be-recognized region.

The deformable convolution module adds a trainable two-dimensional offset to a sampling position of a conventional grid in a standard convolution module, so that a sampling grid can be freely deformed.

The adding, by the deformable convolution module, a trainable two-dimensional offset to a sampling position of a conventional grid in a standard convolution module, so that a sampling grid can be freely deformed specifically includes:

(1) conducting sampling on feature mapping x by using a regular convolution grid;

(2) obtaining a sum of sampling values of a weight w, where the grid is used to define a size and a position of a current reception field;

$$\mathrm{grid} = \{(-1,-1),(-1,0),\ldots,(0,1),(1,1)\}$$

(3) obtaining a sum of a weight w of each position in the convolution grid and an input x in a position pn, to obtain an output y in each position p0 in a feature graph output by each convolutional layer:

$$y(p_0) = \sum_{p_n \in grid} w(p_n) \cdot x(pn) + b$$

where in this formula, pn is a sampling point position in the feature graph before deformation occurs, and p0 is a sampling point position in the feature graph after deformation occurs;

(4) obtaining a trainable offset $\Delta p_n$, where the trainable offset satisfies the following constraint condition:

$$\{\Delta p_n | n=1,\ldots,N\}, N=|\mathrm{grid}|$$

(5) introducing the trainable offset $\Delta_{pn}$ into a conventional convolution model to obtain a deformable convolution formula:

$$y(p_0) = \sum_{p_n \in grid} w(p_n) \cdot x(pn + \Delta p_n) + b$$

The first convolutional layer module includes a convolutional layer C1 and a convolutional layer C2; the second convolutional layer module includes a convolutional layer C3 and a convolutional layer C4; the third convolutional layer module includes a convolutional layer C5 and a convolutional layer C6; the fourth convolutional layer module includes a convolutional layer C7 and a convolutional layer C8; the fifth convolutional layer module includes a convolutional layer C9 and a convolutional layer C10; the sixth convolutional layer module includes a convolutional layer C11 and a convolutional layer C12; the seventh convolutional layer module includes a convolutional layer C13 and a convolutional layer C14; and the eighth convolutional layer module includes a convolutional layer C15 and a convolutional layer C16. A size of a convolution kernel of each of the convolutional layers C1-16 is a 3×3 (length×width) matrix, and a missing part in the feature graph in a convolution process is padded in a padding mode. A size of a convolution kernel of each of the first convolutional layer, the second convolutional layer, the third convolutional layer, and the fourth convolutional layer is a 2×2 (length×width) matrix. After deconvolution, a concatenate function is used for feature aggregation to aggregate a feature graph of a deconvolutional layer in a downsampling process and a feature graph of a convolutional layer during corresponding upsampling. First, an "improved U-Net model" is trained to obtain an optimal network model. Then, a trainable offset is introduced based on the network model to finally obtain the deformable FCN, and then the whole training is conducted on the deformable FCN to obtain a final model.

Figure 2:
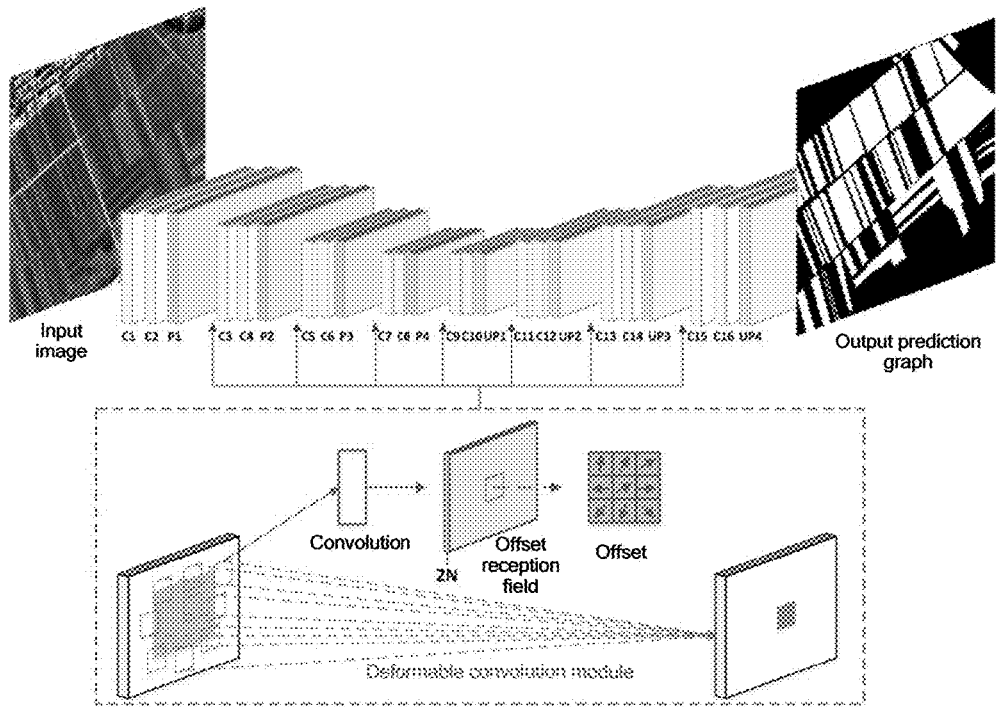
FIG. 2 is a structure diagram of a deformable FCN according to one embodiment of the present invention.

FIG. 2 is a structure diagram of a deformable FCN according to an example of the present invention. As shown in FIG. 2, conventional convolution uses a fixed convolution shape, and includes two steps: (1) conducting sampling on feature mapping x by using a regular convolution grid, and (2) obtaining a sum of sampling values of a weight w. The grid is used to define a size and a position of a current reception field, for example, $$grid = \{(-1,-1),(-1,0), \ldots ,(0,1),(1,1)\}$$

where the grid is used to define a kernel whose reception field is located in the center and whose size is 3×3.

A sum of a weight w of each position in the grid and an input x in a position pn is obtained to obtain an output y in each position p0 in a feature graph, and a formula is as follows.

$$y(p_0) = \sum_{p_n \in grid} w(p_n) \cdot x(pn) + b$$

Fixed convolution does not involve space and size information of a feature object in a feature graph, and cannot adapt space geometry transformation of the object. Therefore, in this specification, a shape of the grid is changed by introducing a trainable offset during a convolution process.

A trainable offset $\Delta p_n$ is obtained, where the trainable offset satisfies the following constraint condition:

$$\{\Delta p_n | n=1, \ldots ,N\}, N=|grid|$$

It can be learned from the above formula that, the deformable offset includes a position coordinate of a local reception field in the input feature graph. A model can obtain a capability for expressing space information by introducing the deformable offset in a conventional convolution process. A formula of the deformable convolution is as follows:

$$y(p_0) = \sum_{p_n \in grid} w(p_n) \cdot x(pn + \Delta p_n) + b$$

Therefore, current sampling is conducted in an irregular offset position $p_n + \Delta p_n$. The convolution computation is conducted based on a pixel in a position corresponding to an integer, but $\Delta p_n$ is usually a fraction or a decimal. Therefore, bilinear interpolation should be conducted on an input x in the above formula $$y(p_0) = \sum_{p_n \in grid} w(p_n) \cdot x(pn + \Delta p_n) + b.$$

The formula is as follows:

$$x(p) = \sum_q G(q, p) \cdot x(q)$$

where in this formula, p represents a shifted position ($p = p_0 + p_n + \Delta p_n$), and q enumerates all spatial positions of the feature mapping x. G(q,p) is a two-dimensional kernel in bilinear interpolation, and may be split into two one-dimensional kernels:

$$G(q,p) = g(q_x, p_x) \cdot g(q_y, p_y)$$

In the above steps, a trainable offset is added in the middle of a convolution module to shift a convolution sampling point to obtain an adaptive reception field, thereby implementing deformable convolution. During the training process, a convolution kernel and an offset used to generate an output feature are simultaneously learned, so that the model can capture a geometric change feature of a winter wheat object in the high-resolution image and reduce the effect of "salt-and-pepper" noise.

Deformable FCN Model:

A U-Net model uses a deep network structure and a superimposed spliced feature graph to enhance an expression effect of spatial and semantic features. Through back propagation, a sparsely connected network structure, and weight sharing, an optimal feature can be automatically learned. Moreover, while reducing precomputation pressure of a computer, it is ensured that a feature of an object in the image can be used to represent a feature of a similar object. However, because padding is not used in the U-Net model during the convolution process, two pixels will be missing along a length and a width of each layer of the feature graph. Moreover, a fixed convolution structure also limits the expression of a complex geometric change with the network model. Therefore, in this specification, a U-Net network structure is improved, and a deformable convolution module is introduced. The network includes five parts: 16 convolutional layers, 4 pooling layers, 4 deconvolutional layers and 8 deformable convolution modules. C1 to C16 are convolutional layers.

The convolutional layer is used to conduct feature extraction on an input image and generate a feature mapping graph. P1-P5 are the pooling layers, and each pooling layer is used to compress the feature mapping graph through downsampling, so as to reduce the network computing complexity; UP1-UP4 are the deconvolutional layers, and each deconvolutional layer is used to enable a low-dimensional feature graph up-sampled to implement end-to-end training; and before being applied to C3, C5, C7, C9, C11, C13, and C15, the deformable convolution module implements deformable convolution by training an offset including position information of a sampling point, to obtain a geometric deformation feature of winter wheat.

A size of a convolution kernel of each convolutional layer in the network is 3×3, and "same padding" is used for padding a missing part of the feature graph during the convolution process. After convolution operation is conducted, L2 regularization term is added to suppress a feature variable to avoid overfitting. A linear rectification function (Relu) is used as an activation function of the convolutional network to enhance a nonlinear relationship between the layers of the network. In the network, a 2×2 max pooling layer is added after each convolutional layer, and dropout is used to randomly inactivate neurons, thereby avoiding model overfitting while reducing pressure on the network training resulting from massive parameters. The deconvolutional layer uses a 2×2 convolution kernel. After deconvolution, a concatenate function is used for feature aggregation.

According to the automatic interpretation method for winter wheat based on a deformable FCN provided in the present invention, for a ground object of winter wheat in a high-resolution remote sensing image, a trainable offset is introduced into the improved U-Net network model to implement deformable convolution and obtain a deformable convolution capability. A deformable FCN model can enhance the expression of a geometric change feature of winter wheat in a high-resolution remote sensing image while fully expressing a spectral and time feature of the winter wheat, so as to enhance the robustness and a generalization capability of the model and significantly reduce "salt-and-pepper noise". The present invention provides the automatic interpretation method for winter wheat based on a deformable FCN. The improved U-Net model is introduced into the field of winter wheat area extraction; a high-resolution No. 2 remote sensing image is used as a research object; the multi-feature extraction of winter wheat is conducted by using the model, and an idea of deformable convolution is introduced; and a trainable two-dimensional offset is added before each convolutional layer in the network to implement deformable convolution and obtain object-level semantic information. In this way, the method can eliminate the interference resulting from a characteristic "the same spectrum with different objects" of the remote sensing image while enhancing the expression of features of winter wheat with different sizes and spatial distributions by using the model.

Each example of the present specification is described in a progressive manner, each example focuses on the difference from other examples. For the same and similar parts between the examples, mutual reference may be made.

Several examples are used herein for illustration of the principle and implementations of the present invention. The description of the foregoing examples is used to help illustrate the method of the present invention and the core principle thereof. In addition, a person of ordinary skill in the art can make various modifications in terms of specific implementations and scope of application in accordance with the teachings of the present invention. In conclusion, the content of this specification shall not be construed as a limitation to the present invention.

What is claimed is:

1. An automatic interpretation method for winter wheat based on a deformable fully convolutional neural network (FCN), comprising the following steps:

step 1: using a region corresponding to a winter wheat planting area as a research region, and obtaining a high-resolution remote sensing image of the research region;

step 2: preprocessing the obtained remote sensing image: extracting geometric changes of sizes, fields of view, postures, and partial deformation of winter wheat objects in different spatial positions in the high-resolution image as sample data;

step 3: establishing the deformable FCN, wherein the deformable FCN comprises a network input layer, a network output layer, a first convolutional layer module, a second convolutional layer module, a third convolutional layer module, a fourth convolutional layer module, a fifth convolutional layer module, a sixth convolutional layer module, a seventh convolutional layer module, and an eighth convolutional layer module; a first pooling layer and a first deformable convolution module are successively arranged between the first convolutional layer module and the second convolutional layer module; a second pooling layer and a second deformable convolution module are successively arranged between the second convolutional layer module and the third convolutional layer module; a third pooling layer and a third deformable convolution module are successively arranged between the third convolutional layer module and the fourth convolutional layer module; a fourth pooling layer and a fourth deformable convolution module are successively arranged between the fourth convolutional layer module and the fifth convolutional layer module; a first deconvolutional layer and a fifth deformable convolution module are successively arranged between the fifth convolutional layer module and the sixth convolutional layer module; a second deconvolutional layer and a sixth deformable convolution module are successively arranged between the sixth convolutional layer module and the seventh convolutional layer module; a third deconvolutional layer and a seventh deformable convolution module are successively arranged between the seventh convolutional layer module and the eighth convolutional layer module; and a fourth deconvolutional layer is arranged between the eighth convolutional layer module and the network output layer;

the network input layer is used to convert both constructed image data and marked data in the winter wheat area in the image data into corresponding three-dimensional tensors through python;

the network output layer is used to predict to-be-predicted image data by using a trained model, to obtain a final prediction graph based on each pixel;

the convolutional layer module is used to conduct feature extraction on an input image, and generate a feature mapping graph;

the pooling layer is used to conduct downsampling on a feature graph output by a previous convolutional layer, and compress the feature mapping graph through downsampling, so as to reduce the network computing complexity;

the deconvolutional layer is used to enable a low-dimensional feature graph upsampled to a high-dimensional prediction graph to implement end-to-end training;

the deformable convolution module is used to implement deformable convolution by training an offset comprising position information of a sampling point, to obtain a geometric deformation feature of winter wheat;

step 4: inputting the sample data to the deformable FCN to implement training of the deformable FCN; and step 5: inputting a to-be-recognized remote sensing image of winter wheat to the trained deformable FCN, and outputting a prediction graph of a winter wheat planting area in a to-be-recognized region.

2. The automatic interpretation method for winter wheat based on a deformable FCN according to claim 1, wherein the deformable convolution module adds a trainable two-dimensional offset to a sampling position of a conventional grid in a standard convolution module, so that a sampling grid can be freely deformed.

3. The automatic interpretation method for winter wheat based on a deformable FCN according to claim 2, wherein the adding, by the deformable convolution module, a trainable two-dimensional offset to a sampling position of a conventional grid in a standard convolution module, so that a sampling grid can be freely deformed specifically comprises:

(1) conducting sampling on feature mapping x by using a regular convolution grid;

(2) obtaining a sum of sampling values of a weight w, wherein the grid is used to define a size and a position of a current reception field;

$$\text{grid} = \{(-1,0), \ldots, (0,1), (1,1)\}$$

(3) obtaining a sum of a weight w of each position in the convolution grid and an input x in a position pn, to obtain an output y in each position p0 in a feature graph output by each convolutional layer:

$$y(p_0) = \sum_{p_n \in grid} w(p_n) \cdot x(pn) + b,$$

wherein in this formula, pn is a sampling point position in the feature graph before deformation occurs, and p0 is a sampling point position in the feature graph after deformation occurs;

(4) obtaining a trainable offset $\Delta p_n$, wherein the trainable offset satisfies the following constraint condition:

$$\{\Delta p_n | n=1, \ldots, N\}, N=|\text{grid}|$$

(5) introducing the trainable offset $\Delta p_n$ into a conventional convolution model to obtain a deformable convolution formula:

$$y(p_0) = \sum_{p_n \in grid} w(p_n) \cdot x(pn + \Delta p_n) + b.$$

4. The automatic interpretation method for winter wheat based on a deformable FCN according to claim 1, wherein the first convolutional layer module comprises a convolutional layer C1 and a convolutional layer C2; the second convolutional layer module comprises a convolutional layer C3 and a convolutional layer C4; the third convolutional layer module comprises a convolutional layer C5 and a convolutional layer C6; the fourth convolutional layer module comprises a convolutional layer C7 and a convolutional layer C8; the fifth convolutional layer module comprises a convolutional layer C9 and a convolutional layer C10; the sixth convolutional layer module comprises a convolutional layer C11 and a convolutional layer C12; the seventh convolutional layer module comprises a convolutional layer C13 and a convolutional layer C14; and the eighth convolutional layer module comprises a convolutional layer C15 and a convolutional layer C16.

5. The automatic interpretation method for winter wheat based on a deformable FCN according to claim 3, wherein a size of a convolution kernel of each of the convolutional layers C1-16 is a 3×3 matrix, and a missing part in the feature graph in a convolution process is padded in a padding mode.

6. The automatic interpretation method for winter wheat based on a deformable FCN according to claim 1, wherein a size of a convolution kernel of each of the first convolutional layer, the second convolutional layer, the third convolutional layer, and the fourth convolutional layer is a 2×2 matrix; and after deconvolution, a concatenate function is used for feature aggregation to aggregate a feature graph of a deconvolutional layer in a downsampling process and a feature graph of a convolutional layer during corresponding upsampling.

* * * * *